(12) United States Patent
Sugihara (10) Patent No.: US 7,532,229 B2
(45) Date of Patent: May 12, 2009

(54) DATA PROCESSOR, DATA PROCESSING METHOD AND ELECTRONIC EQUIPMENT

(75) Inventor: Mitsuaki Sugihara, Tokyo (JP)

(73) Assignee: NEC Corporation, Tokyo (JP)

( * ) Notice: Subject to any disclaimer, the term of this patent is extended or adjusted under 35 U.S.C. 154(b) by 760 days.

(21) Appl. No.: 10/985,983

(22) Filed: Nov. 12, 2004

(65) Prior Publication Data

US 2005/0108162 A1    May 19, 2005

(30) Foreign Application Priority Data

Nov. 14, 2003   (JP)   ............... 2003-384559

(51) Int. Cl.
H04N 7/14 (2006.01)
H04M 11/00 (2006.01)
(52) U.S. Cl. ............... 348/14.01; 348/14.03; 348/14.07
(58) Field of Classification Search ... 348/14.01–14.09, 348/14.1, 14.11–14.16; 379/52, 93.17, 88.24; 455/550.1, 556.1, 554.2
See application file for complete search history.

(56) References Cited

U.S. PATENT DOCUMENTS

| 5,341,466 | A   | 8/1994  | Perlin et al.  |
| 5,815,196 | A   | 9/1998  | Alshawi        |
| 6,490,343 | B2  | 12/2002 | Smith, Jr. et al. |
| 6,618,072 | B2* | 9/2003  | Naito ............ 348/14.07 |

FOREIGN PATENT DOCUMENTS

| CN | 1413028 A    | 4/2003  |
| EP | 1111926 A2   | 6/2001  |
| JP | 04042624 A   | 2/1992  |
| JP | 2001-309073 A | 11/2001 |
| JP | 2002-374366 A | 12/2002 |
| KR | 00251959 B1  | 1/2000  |

* cited by examiner

Primary Examiner—Melur Ramakrishnaiah
(74) Attorney, Agent, or Firm—Sughrue Mion, PLLC (57) ABSTRACT

A cellular telephone including a function of a videophone is provided. During connection through a communication path, character data is combined with image data to obtain composite data. Thus, it is no longer necessary to transmit the character data through a different channel from the image data. Moreover, during connection of the communication path, the character data in the composite data relevant to the contents of the talk, for example, can be displayed on a display. Thus, the contents of the talk (information) can be quickly and accurately transmitted.

17 Claims, 9 Drawing Sheets

FIG.1   100 CELLULAR TELEPHONE

FIG. 7  100 CELLULAR TELEPHONE

| MEMORY NUMBER 601 | ASSIGNED KEY 602 | CHARACTER STRING DATA 603 | DISPLAY EFFECT 604 |
|---|---|---|---|
| #1 | 1 KEY | HELLO | STOP FOR 2 SECONDS |
| #2 | 2 KEY | I'M COMING HOME NOW | LATERAL SCROLL |
| ∫ | ∫ | ∫ | ∫ |
| #n | n KEY | PLEASE COME AND PICK ME UP | BLINKING |

600
CHARACTER STRING TABLE

DATA PROCESSOR, DATA PROCESSING METHOD AND ELECTRONIC EQUIPMENT

BACKGROUND OF THE INVENTION

1. Field of the Invention

The present invention relates to a data processor, a data processing method and electronic equipment for combining image data, obtained by forming an image with a camera, with character data generated by use of a numeric keypad and the like.

Particularly, the present invention relates to a data processing method and a data processor for, during a talk (transmission of data) over a videophone which simultaneously transmits/receives image and voice data, for example, combining character data related to contents of the talk with the above-described image data and for transmitting the combined data. In addition, the present invention also relates to electronic equipment such as a cellular telephone including this data processor.

2. Description of the Related Art

In order to differentiate one's product from others or to meet the needs of users, various functions such as a videophone are added into electronic equipment such as a cellular telephone, a PHS (Personal Handy phone System) and the like. For example, a cellular telephone having a function of the above-described videophone is equipped with a camera using a CCD (charge-coupled device) and the like and is equipped with a screen such as an LCD (Liquid Crystal Display) which displays image data obtained by forming an image with the above-described camera. Thus, the cellular telephone with the videophone function described above can transmit and receive the above-described image data with voice data inputted by use of a microphone.

Note that, among the cellular telephones, there has been disclosed a technology of receiving image data (the above-described image data obtained by forming an image) which includes an image photographed by a camera of a certain cellular telephone and transmitted through a transmitting circuit, by a receiving circuit of another cellular telephone, and of displaying the received image data and other image data on a display of the cellular telephone (see Patent Document 1 that is Japanese Patent Laid-Open No. 2001-309073).

Moreover, there has been heretofore disclosed a communication device and a communication system, which include secondary information generation means for generating secondary information different from primary information transmitted and received in communication (see Patent Document 2 that is Japanese Patent Laid-Open No. 2002-374366). The communication device and communication system of Patent Document 2 transmit secondary information indicating emotions and the like, which is generated by the secondary information generation means, during transmitting and receiving the primary information.

Incidentally, regarding the cellular telephone with the videophone function described above, communication of the cellular telephone described above by use of voice data may be difficult or impossible in communication at a place with a lot of noise around, communication at a place where high-volume voices cannot be emitted, communication with a hearing-impaired person, and the like. In this case, the cellular telephone depends on communication only by use of image data (visual information). Specifically, the cellular telephone with the videophone function described above has difficulty in quickly and accurately transmitting information contents only by use of the image data.

Note that the electronic equipment of Patent Document 1 and the communication device of Patent Document 2 are not electronic equipment with a videophone function, which simultaneously transmits/receives image and voice data. Specifically, the electronic equipment of Patent Document 1 and the communication device of Patent Document 2 cannot transmit image data generated during a talk over the videophone, together with other image data, to a cellular telephone at the opposite end during the talk.

SUMMARY OF THE INVENTION

Accordingly, it is an object of the present invention to provide a data processor, a data processing method and electronic equipment, for example, which are capable of, during a talk over a videophone which simultaneously transmits/receives image and voice data, quickly and accurately transmitting contents of the talk.

In order to achieve the above-described object, the data processor, the data processing method and the electronic equipment according to the present invention adopt the following characteristic configurations.

The data processor according to the present invention includes: imaging means for forming an image of an object and generating image data of the image; character generation means for generating character data; converting means for converting the character data to character image data of image data configuration; transmission means for connecting to an opposite communication device through a communication path, and for transmitting data to the opposite communication device; and data composition means for generating composite data by combining the image data generated by the imaging means with the character image data, during connection of the transmission means through the communication path.

The data processing method according to the present invention includes: generating image data by forming an image of an object with imaging means; generating character data by character generation means; converting the character data to character image data of image data configuration by converting means; and generating composite data obtained by combining the image data with the character image data during connection of transmission means by a communication path.

The electronic equipment according to the present invention includes: imaging means for forming an image of an object and generating image data of the image; voice input means for inputting voices and generating voice data of the inputting voice; character generation means for generating character data; converting means for converting the character data to character image data of image data configuration; transmission means for connecting to an opposite communication device through a communication path, and for continuously transmitting the image data generated by the imaging means as well as the voice data generated by the voice input means to the opposite communication device; and data composition means for generating composite data by combining the image data generated by the imaging means with the character image data, during connection of the transmission means through the communication path. In the electronic equipment, the transmission means transmits the composite data generated by the data composition means to the opposite communication device during connection of the communication path.

Note that the image data conceptually includes still image data or moving image data.

It is preferable that the present invention is applied to a data processor, a data processing method or electronic equipment including a function of a so-called videophone, which simultaneously and continuously transmits voice and image data. During connection of a communication path, the above-described data processor, data processing method or electronic equipment combines the character image data with the image data to obtain the composite data. The composite data is transmitted during connection of the communication path.

Specifically, during connection of the communication path, character data related to the contents of the talk described above, for example, is converted to the character image data, and the character image data is combined (image combined) with the above-described image data, to obtain the composite data. Accordingly, the composite data can be transmitted. Thus, the image data corresponding to the character data included in the composite data can be displayed on a display. Consequently, the contents of the talk (information) can be quickly and accurately transmitted.

Therefore, the image data corresponding to the character data included in the composite data is visible without using a voice. Thus, information can be transmitted well even in communication at a place with a lot of noise around, communication at a place where high-volume voices cannot be emitted, communication with a hearing-impaired person, and the like.

Note that, in the present invention, during connection of the communication path, the character data related to the contents of the talk described above, for example, is combined with the above-described image data, as images, to obtain composite data (composite image data). Thus, it is no longer necessary to transmit the character data through a different channel from that of the image data.

Specifically, in the present invention, text character data (for example, character codes such as JIS kanji codes or ASCII codes), for example, is combined with the above-described image data, as images, to obtain composite data. Thus, without assuming a multi-access function of simultaneously transmitting the character and image data, for example, through different channels, the present invention is applicable as it is as long as the electronic equipment is one including the videophone function.

Therefore, the present invention is applicable as it is even if electronic equipment such as a (receiving) cellular telephone of a communication party is one not having the multi-access function. For example, the character data to be incorporated into the above-described image data is combined as image data. Thus, the image data corresponding to the character data included in the composite data is displayed, without being garbled, on a display of the receiving cellular telephone described above.

The data processor according to the present invention may further include data (videophone) processing means for simultaneously processing image data obtained by forming an image with the imaging means and voice data inputted by the voice input means.

DESCRIPTION OF THE PREFERRED EMBODIMENTS

First Embodiment

With reference to FIGS. 1 to 6, description will be given below of a data processor, a data processing method and electronic equipment, for example, a cellular telephone, all of which are a first embodiment of the present invention. Note that the data processor or the cellular telephone according to this embodiment includes a function of a so-called videophone which simultaneously and continuously transmits voice and image data.

Figure 1:
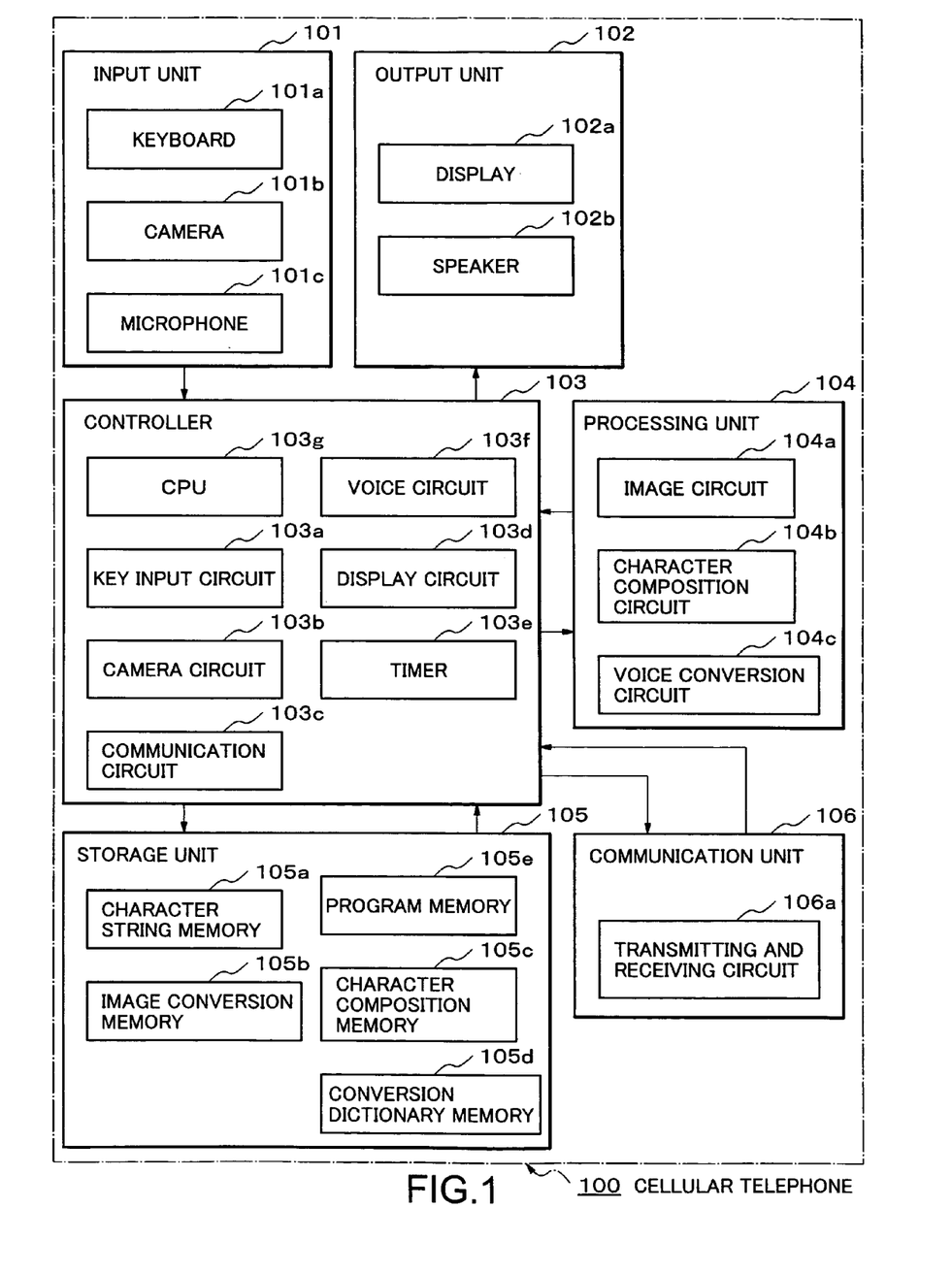
FIG. 1 is a block diagram of a cellular telephone according to a first embodiment of the present invention.

As shown in FIG. 1, a cellular telephone 100 includes an input unit 101, an output unit 102, a controller 103, a processing unit 104, a storage unit 105 and a communication unit 106. This communication unit 106 is connected to a cellular telephone (an opposite communication device) of a communication party through a communication path and includes a transmitting and receiving circuit 106a for transmitting and receiving data by radio.

The input unit 101 includes: a keyboard 101a for inputting character key data; a camera 101b for forming an image of an object such as a person and a landscape; and a microphone 101c for inputting a voice.

Moreover, the output unit 102 includes: a display 102a such as an LCD which displays character data or image data for the videophone and the like; and a speaker 102b for outputting a voice.

The controller 103 includes: a key input circuit 103a for controlling input processing of the keyboard 101a; a camera circuit 103b for controlling the camera 101b; a communication circuit 103c for controlling the communication unit 106; a display circuit 103d for controlling display of image data on the display 102a; a timer 103e used for controlling time; a voice circuit 103f for controlling input and output of a voice (signal); and a CPU (Central Processing Unit) 103g.

The CPU 103g controls overall operation of the cellular telephone 100. For example, when a key (not shown in the attached drawings) of the keyboard 101a is pressed (operated), the CPU 103g performs processing based on the key operation. The controller 103 including the CPU 103g is data (videophone) processing means for simultaneously processing image data (object image) obtained by forming the image with the camera 101b and voice data inputted by the microphone 101c. The camera 101b and the camera circuit 103b constitute a part of imaging means.

The processing unit 104 includes an image circuit 104a, a character composition (image combine) circuit 104b that is data composition means, and a voice conversion circuit 104c. The voice conversion circuit 104c is a circuit which includes an analog/digital converter and a digital/analog converter and converts the voice (signal) from the voice circuit 103f into a digital signal or an analog signal.

The image circuit 104a is a circuit which converts the image data obtained by forming an image with the camera 101b (still image data or moving image data from the camera circuit 103b) into image data (of the videophone) to be displayed on the display 102a. The character composition circuit 104b includes a converting circuit which controls the image circuit 104a for converting text character data (for example, character codes such as JIS kanji codes or ASCII codes) supplied from the key input circuit 103a to character image data, and combines the character image data with the image data.

The storage unit 105 includes a character string memory 105a, an image conversion memory 105b, a character composition memory 105c, a conversion dictionary memory 105d and a program memory 105e. The program memory 105e stores programs for executing processing such as transmission of data.

The character string memory 105a includes a storage area for storing text character data to be converted by the conversion dictionary memory 105d. The image conversion memory 105b stores conversion data used when the image data obtained by forming the image with the camera 101b is converted into the image data of the videophone to be displayed on the display 102a.

The character composition memory 105c stores composition data used when text character data is combined (image combined) with image data of the videophone. The conversion dictionary memory 105d stores a "character conversion table" which establishes a correlation between the character key data inputted from the keyboard 101a and the text character data corresponding to the character key data. The keyboard 101a, the key input circuit 103a and the conversion dictionary memory 105d constitute a part of character generation means.

Figure 2:
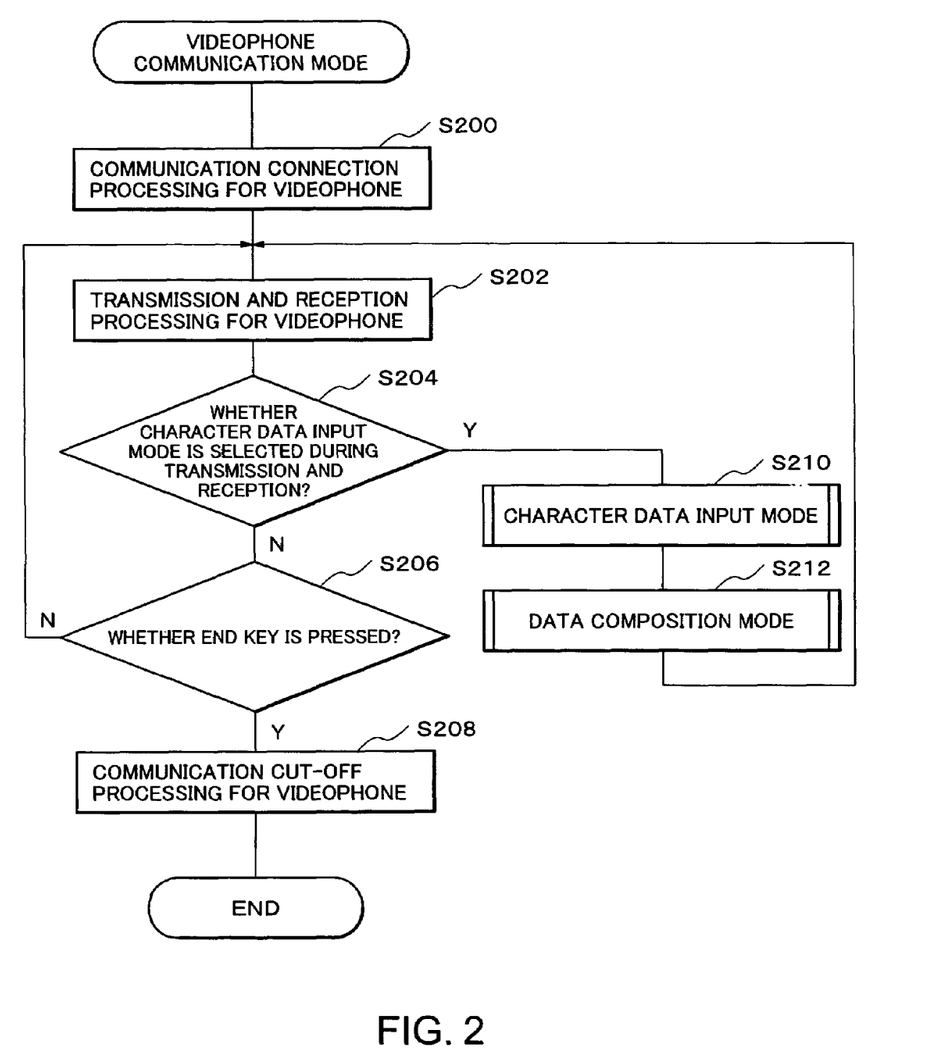
FIG. 2 is a flowchart showing a processing flow of a communication mode program of a videophone according to the first embodiment.
Figure 3:
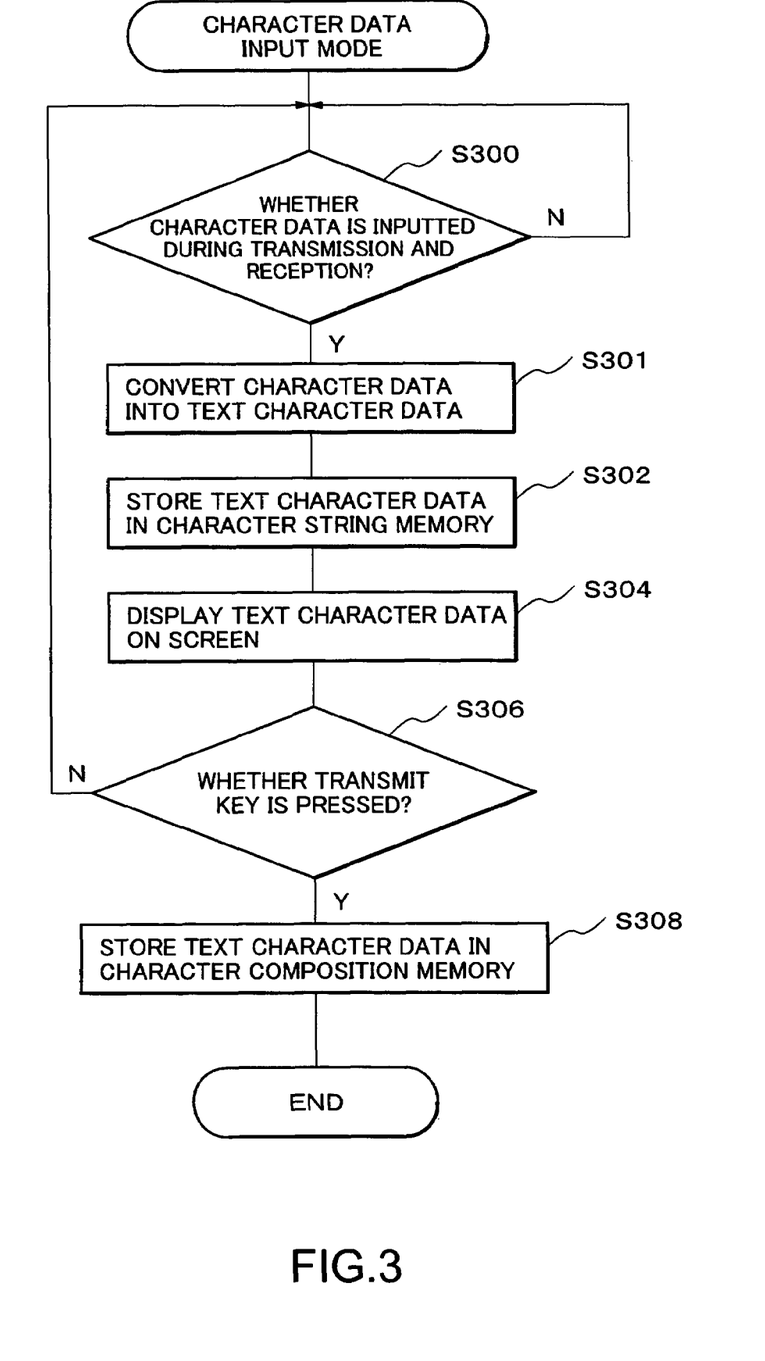
FIG. 3 is a subroutine showing a processing flow of a character data input mode shown in FIG. 2.
Figure 4:
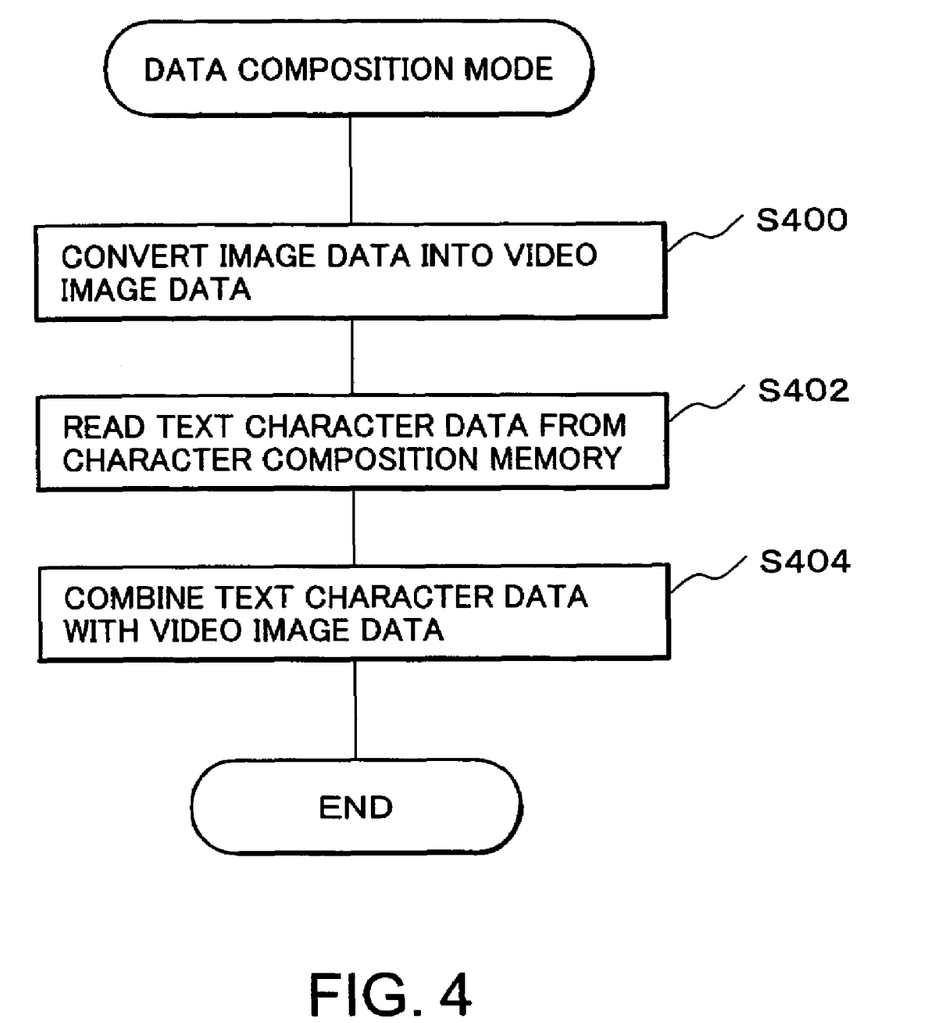
FIG. 4 is a subroutine showing a processing flow of a data composition mode shown in FIG. 2.

With reference to FIGS. 2 to 4, description will be given of processing related to videophone modes of the cellular telephone 100 for executing transmission and reception by the videophone. The videophone communication mode shown in FIG. 2 is mode including a videophone transmission and reception mode, a character data input mode and a data composition mode.

FIG. 2 is a flowchart showing a processing routine executed by the controller 103 of the cellular telephone 100. A program regarding this processing routine is previously stored in a program region of the program memory 105e.

Moreover, the flowchart shown in FIG. 2 is processing executed when a power switch (not shown) of the cellular telephone 100 is turned on by a user and, thereafter, telephone number data is inputted by operating keys of the keyboard 101a. Specifically, the user generates character data (establishes the character data input mode) during communication over the videophone by use of the cellular telephone 100 on the premise that, first, telephone number data of another (receiving) cellular telephone is inputted to the key input circuit 103a of the controller 103.

As shown in FIG. 2, in Step S200, the communication circuit 103c of the controller 103 executes processing of connecting the videophone to the cellular telephone of the inputted telephone number data (for example, processing by a protocol of the 3G (third-generation mobile telephone)—324M (an audio-visual communication standard used in 3G) standard for videophones, and the like) through the transmitting and receiving circuit 106a of the communication unit 106.

In Step S202, the communication circuit 103c executes communication processing for the videophone through the transmitting and receiving circuit 106a. This processing is based on the premise that the user forms an image of an object by use of the camera 101b (see FIG. 1) and inputs a voice by use of the microphone 101c (see FIG. 1). Specifically, as shown in FIG. 1, in the image circuit 104a, image data of the object, which is obtained through the camera 101b and the camera circuit 103b, is generated. In the voice conversion circuit 104c, a digital signal is generated through an unillustrated analog-digital converter.

Thereafter, in Step S202, the communication circuit 103c executes processing of transmitting the generated image and voice data (communication of the videophone) through the transmitting and receiving circuit 106a, as described above. Step S200 and S202 are processing in communication modes of videophones regarding communication of a general videophone.

In Step S204, the CPU 103g determines whether or not the character data input mode is selected during communication of the videophone (transmission of image and voice data). Specifically, in Step S204, the key input circuit 103a determines whether or not a preset mode selection key (not shown) of the keyboard 101a is pressed.

If No in Step S204, that is, if the mode selection key is not pressed, the key input circuit 103a determines, in Step S206, whether or not an end key (unillustrated on-hook key) is pressed, which is arranged in the keyboard 101a (see FIG. 1). If No in Step S206, that is, if the end key is not pressed, the processing returns to Step S202 and the communication circuit 103c continues the communication processing for the videophone.

If Yes in Step S206, that is, if the end key is pressed, the communication circuit 103c executes, in Step S208, processing of cutting off the communication of the videophone and the communication of the videophone is terminated. Specifically, if the end key is pressed, the CPU 103g terminates the communication mode of this flowchart.

If Yes in Step S204, that is, if the mode selection key is pressed, the CPU 103g, the key input circuit 103a and the display circuit 103d execute processing of the character data input mode, in Step S210, through the conversion dictionary memory 105d, the character string memory 105a and the character composition memory 105c. After the processing of the character data input mode is executed in Step S210, the CPU 103g and the camera circuit 103b execute processing of the data composition mode, in Step S212, through the character composition memory 105c and the character composition circuit 104b. Specifically, in Step S210 and S212, the CPU 103g, the key input circuit 103a, the camera circuit 103b and the display circuit 103d continuously execute processing of the character data input mode and data composition mode through the conversion dictionary memory 105d, the character string memory 105a, the character composition circuit 104b and the character composition memory 105c.

Subsequently, with reference to FIG. 3, description will be given of the processing of the character data input mode (Step S210) shown in FIG. 2. As shown in FIG. 3, in Step S300, the key input circuit 103a determines whether or not character key data is inputted by pressing character keys (not shown in the attached drawings) of the keyboard 101a during communication of the videophone (transmission of the image and voice data). In Step S300, the key input circuit 103a waits for the character key data to be inputted.

If Yes in Step S300, that is, if character key data is inputted during transmission from the videophone, the key input circuit 103a converts the inputted character key data into text character data, in Step S301, by use of the "character conversion table" stored in the conversion dictionary memory 105d shown in FIG. 1 through the conversion dictionary memory 105d, the character string memory 105a and the character composition memory 105c.

Specifically, in Step S301, the key input circuit 103a checks the inputted character key data against the "character conversion table" stored in the conversion dictionary memory 105d (see FIG. 1) and reads corresponding text character data from the "character conversion table".

In Step S302, the CPU 103g stores the text character data read from the "character conversion table" in Step S301 in the character string memory 105a. In Step S304, the CPU 103g and the display circuit 103d display the text character data stored in Step S302 on a screen of the display 102a for a predetermined period of time (counted by the timer 103e shown in FIG. 1) through the character string memory 105a. Specifically, in Step S304, the CPU 103g and the display circuit 103d read the text character data described above from the character string memory 105a and output the data onto the display 102a.

Here, the character string memory 105a has a preset storage area (storage capacity) and can store the character data until this storage capacity is exhausted. Specifically, the CPU 103g stores the text character data in the character string memory 105a until the storage capacity of the character string memory 105a is exhausted.

In Step S306, the key input circuit 103a determines whether or not an transmit key (not shown in the attached drawings) arranged in the keyboard 101a shown in FIG. 1 is pressed. If No in Step S306, that is, if the transmit key is not pressed, the processing returns to Step S300 and the key input circuit 103a waits for the character key data to be inputted.

If Yes in Step S306, that is, if the transmit key is pressed, the CPU 103g stores the text character data stored in the character string memory 105a shown in FIG. 1 in the character composition memory 105c shown in FIG. 1, in Step S308. Note that, after the processing of Step S308, the processing of the character data input mode is terminated.

Next, with reference to FIG. 4, description will be given of the processing of the data composition mode (Step S212) shown in FIG. 2. As shown in FIG. 4, in Step S400, the CPU 103g outputs the image data (still image data or moving image data) obtained by forming the image with the camera 101b shown in FIG. 1 from the camera circuit 103b to the image circuit 104a shown in FIG. 1. Thus, the image circuit 104a converts the image data into image data of the videophone (video image data) to be displayed on the display 102a.

In Step S402, the CPU 103g shown in FIG. 1 reads the text character data which has been objected to the processing shown in FIG. 3 (see Step S308) from the character composition memory 105c shown in FIG. 1. In Step S404, by using the text character data read from the character composition memory 105c, the character composition circuit 104b shown in FIG. 1 controls image conversion of the text character data (conversion into YUV (a Y signal, a blue color difference signal (Cb) and a red color difference signal (Cr)) still image data and the like) in the image circuit 104a shown in FIG. 1. Moreover, the character composition circuit 104b incorporates the still image data (character image data), which is obtained by the image conversion, into the video image data described above and combines both data.

Specifically, in Step S404, the CPU 103g shown in FIG. 1 outputs the still image data, which is obtained by objecting the above-described text character data to image conversion, and the video image data to the character composition circuit 104b shown in FIG. 1. Moreover, the character composition circuit 104b combines the still image data, which is obtained by objecting the above-described text character data to image conversion, with the video image data to generate composite data (composite image data).

Figure 5:
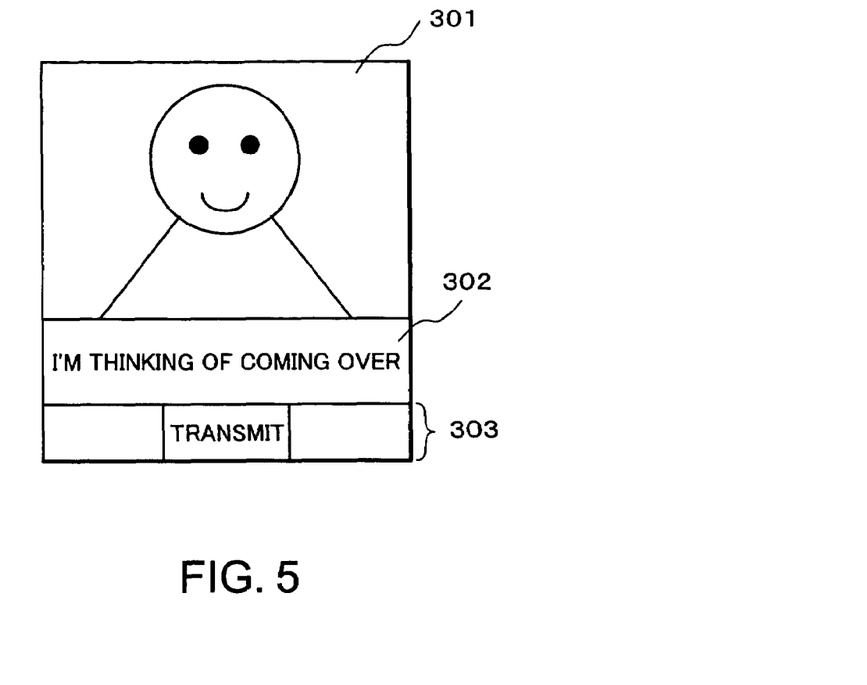
FIG. 5 is a view showing an example of displaying video image data and text character data on a display shown in FIG. 1.

For example, on the display 102a shown in FIG. 1, video image data is displayed in a first display area 301, as shown in FIG. 5. In a second display area 302 below the first display area 301, text character data (for example, "I'm thinking of coming over") is displayed. If the text character data beyond the second display area 302 is inputted, the data is displayed while scrolling the display area. In a third display area 303 below the second display area 302, display data "transmit" is displayed, which is displayed when the transmit key of the keyboard 101a shown in FIG. 1 is pressed.

After the data composition mode shown in FIG. 4 is terminated, the processing returns to Step S202 shown in FIG. 2 and the communication processing for the videophone is subsequently executed. Specifically, the composite data described above and the voice data obtained by the microphone 101c shown in FIG. 1 and the like are delivered (transmitted) to another (receiving) cellular telephone through the transmitting and receiving circuit 106a shown in FIG. 1.

Figure 6:
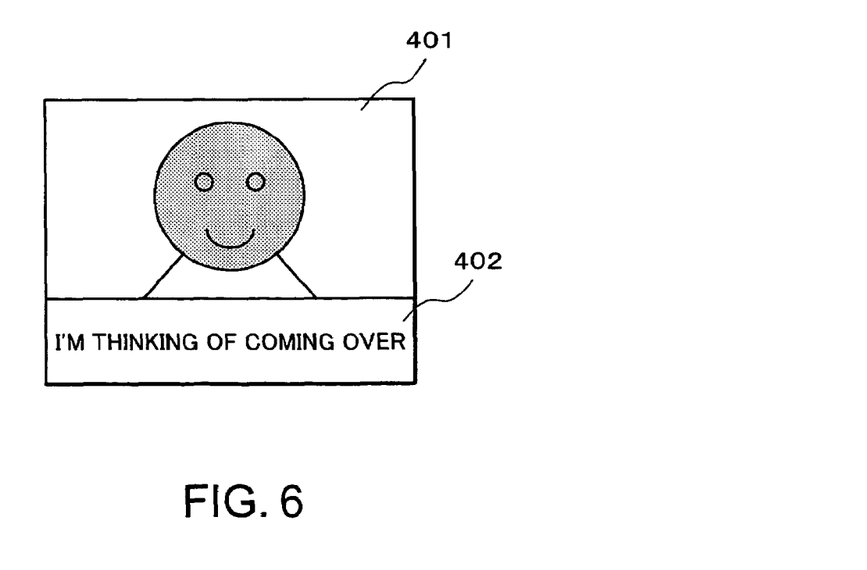
FIG. 6 is a view showing an example of displaying the video image data and the text character data, which are shown in FIG. 5, on a display of a receiving cellular telephone.

The composite data delivered to the receiving cellular telephone is displayed on a display screen of the receiving cellular telephone, as shown in FIG. 6. Specifically, in a first display area 401, video image data as shown in FIG. 6 (the video image data corresponding to that shown in the first display area 301 of FIG. 5) is displayed. In a second display area 402 below the first display area 401, the text character data (for example, "I'm thinking of coming over"), which corresponds to that shown in the second display area 302 of FIG. 5, is displayed. Note that, regarding output of a voice in talking over the videophone, the receiving cellular telephone may be a model including a function of outputting the voice only if an input key (not shown) of the keyboard 101a shown in FIG. 1, for example, is pressed.

In this embodiment, during connection of the cellular telephone of the communication path with the communication party through the transmitting and receiving circuit 106a, the character composition circuit 104b combines the character image data corresponding to the character data stored in the character composition memory 105c with the image data inputted from the camera circuit 103b to obtain the composite data (composite image data). Thus, the character image data corresponding to the character data included in the composite data can be transmitted through the transmitting and receiving circuit 106a.

Specifically, in this embodiment, character data related to contents of a talk, for example, is combined with the above-described image data, as images, to obtain composite data. Accordingly, this composite data can be transmitted. Thus, the image data corresponding to the character data included in the composite data can be displayed on the display. Consequently, the contents of the talk (information) can be quickly and accurately transmitted.

Therefore, in this embodiment, the image data corresponding to the character data included in the composite data is visible, and thus information can be transmitted well even in communication at a place with a lot of noise around, communication at a place where high-volume voices cannot be emitted, communication with a hearing-impaired person, and the like. In this case, voice needs not be used.

Note that, in this embodiment, during connection of the communication path, the character data related to the contents of the talk described above, for example, is combined with the above-described image data, as images (character image data), to obtain the composite data (composite image data). Thus, it is no longer necessary to transmit the character data through a different channel from that of the image data. Specifically, in this embodiment, the text character data, for example, is combined with the above-described image data, as images, to obtain the composite data. Thus, without assuming a multi-access function of simultaneously transmitting the character and image data, for example, through different channels, this embodiment is applicable to a cellular telephone as it is as long as the cellular telephone is one including the videophone function.

Therefore, in this embodiment, the embodiment is applicable as it is even if the (receiving) cellular telephone of the communication party is electronic equipment not having the multi-access function. For example, the character data to be incorporated into the image data is combined as image data. Thus, the image data corresponding to the character data included in the composite data is displayed, without being garbled, on the display of the receiving cellular telephone described above.

Second Embodiment

Figure 7:
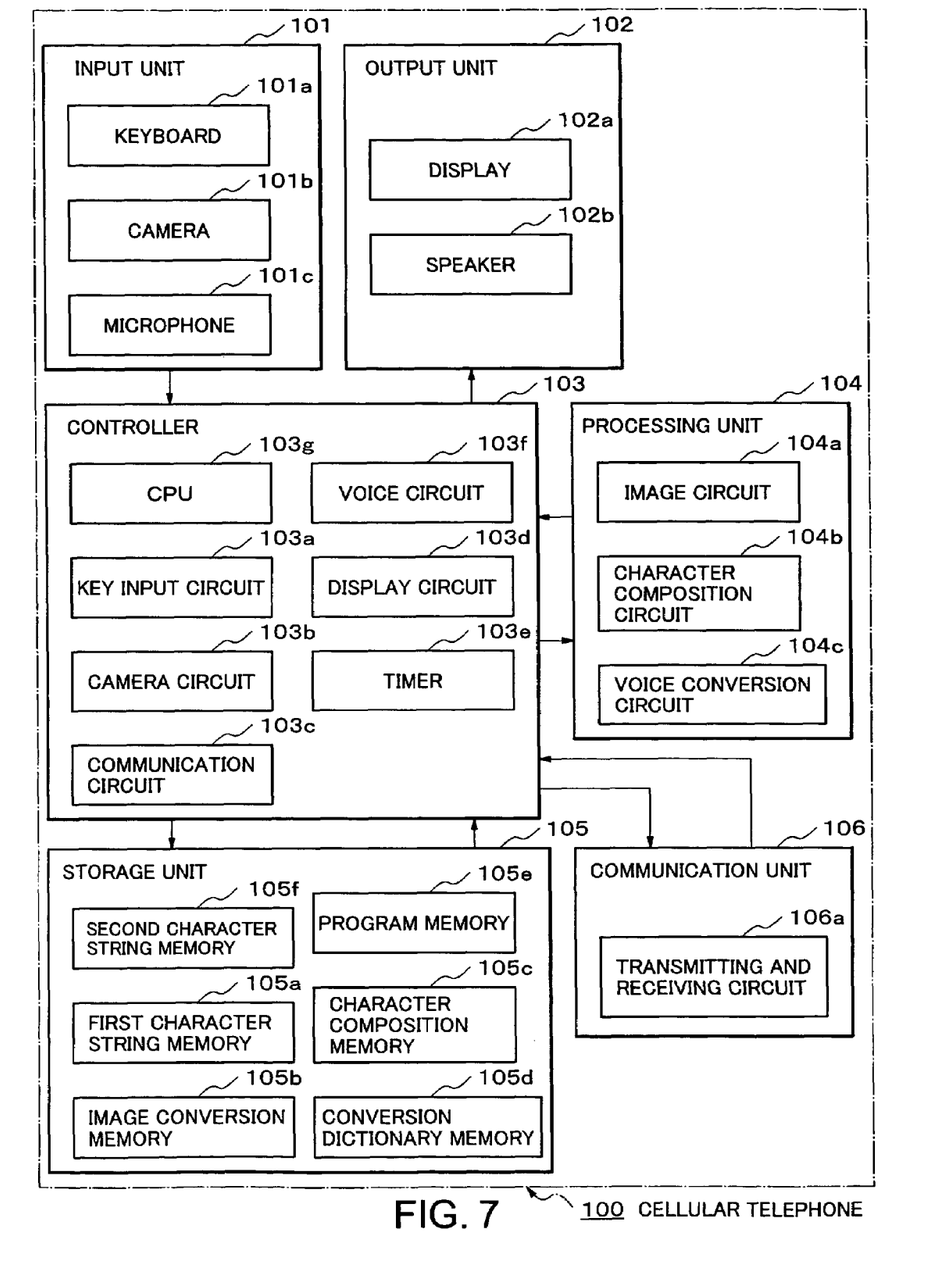
FIG. 7 is a block diagram of a cellular telephone according to a second embodiment of the present invention.
Figure 8:
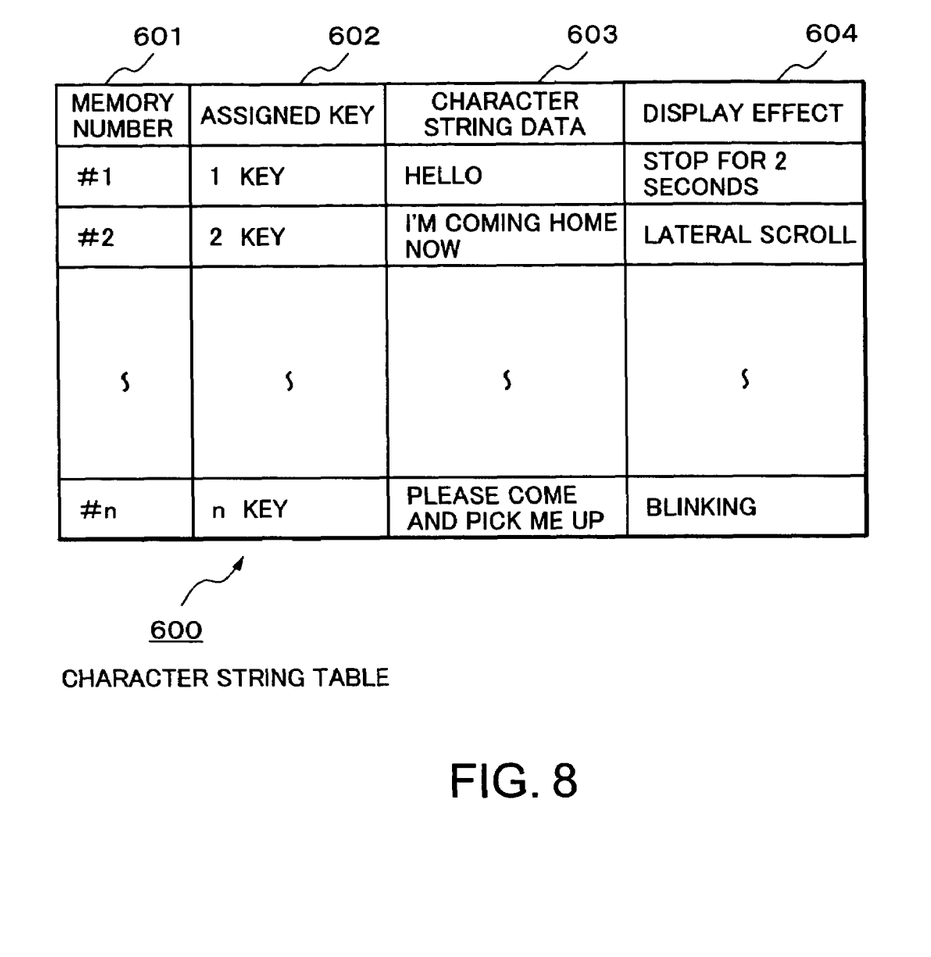
FIG. 8 is a view showing a character string table stored in a second character string memory shown in FIG. 7.

FIGS. 7 to 11 show a second embodiment according to the present invention. FIG. 7 is a block diagram of a cellular telephone 100 of this embodiment. FIG. 8 is a character string table in a second character string memory disposed in a storage unit 105 shown in FIG. 7. Note that, as to a configuration of the cellular telephone of this embodiment, in FIG. 7, components corresponding to those of FIG. 1 are denoted by the same reference numerals, and description thereof will be omitted.

This embodiment is an example of collectively reading a plurality of pieces of text character (character string) data previously stored in the table of the second character string memory by pressing a specific assigned key, besides a "direct character input mode" for processing separately inputted character key data separately from each other (the same processing as that of the first embodiment).

As shown in FIG. 7, the storage unit 105 of the second embodiment includes a first and second character string memories 105a and 105f. The first character string memory 105a includes a storage area for storing text character data which is obtained by converting character key data inputted by use of the keyboard 101a using the conversion dictionary memory 105d. The second character string memory 105f previously stores a plurality of pieces of text character (character string) data such as "Hello," for example.

In this embodiment, the character string data previously stored in the second character string memory 105f is set to be read by pressing a specific key (not shown) in the keyboard 101a shown in FIG. 7.

Specifically, as shown in FIG. 8, a character string table 600 stored in the second character string memory 105f assigns each piece of character string data to a (specific) assigned key and associates these assigned data with command data (display processing data) about display effects.

The character string data 603 is data including, for example, "Hello," "I'm coming home now," "Please come and pick me up" and the like. Moreover, processing regarding display effect 604 is processing of adding various display effects such as stop, scroll and blinking when text character data and video image data are combined.

Note that the character string table 600 shown in FIG. 8 associates an assigned key with a memory number (address) 601. Specifically, when a specific assigned key is pressed, a corresponding memory number (for example, #1 or the like) in the character string table 600 is retrieved and the character string data is called up. Other than the above, the configuration of the cellular telephone 100 of the second embodiment is the same as that of the first embodiment shown in FIG. 1. Thus, detailed description thereof will be omitted.

Figure 9:
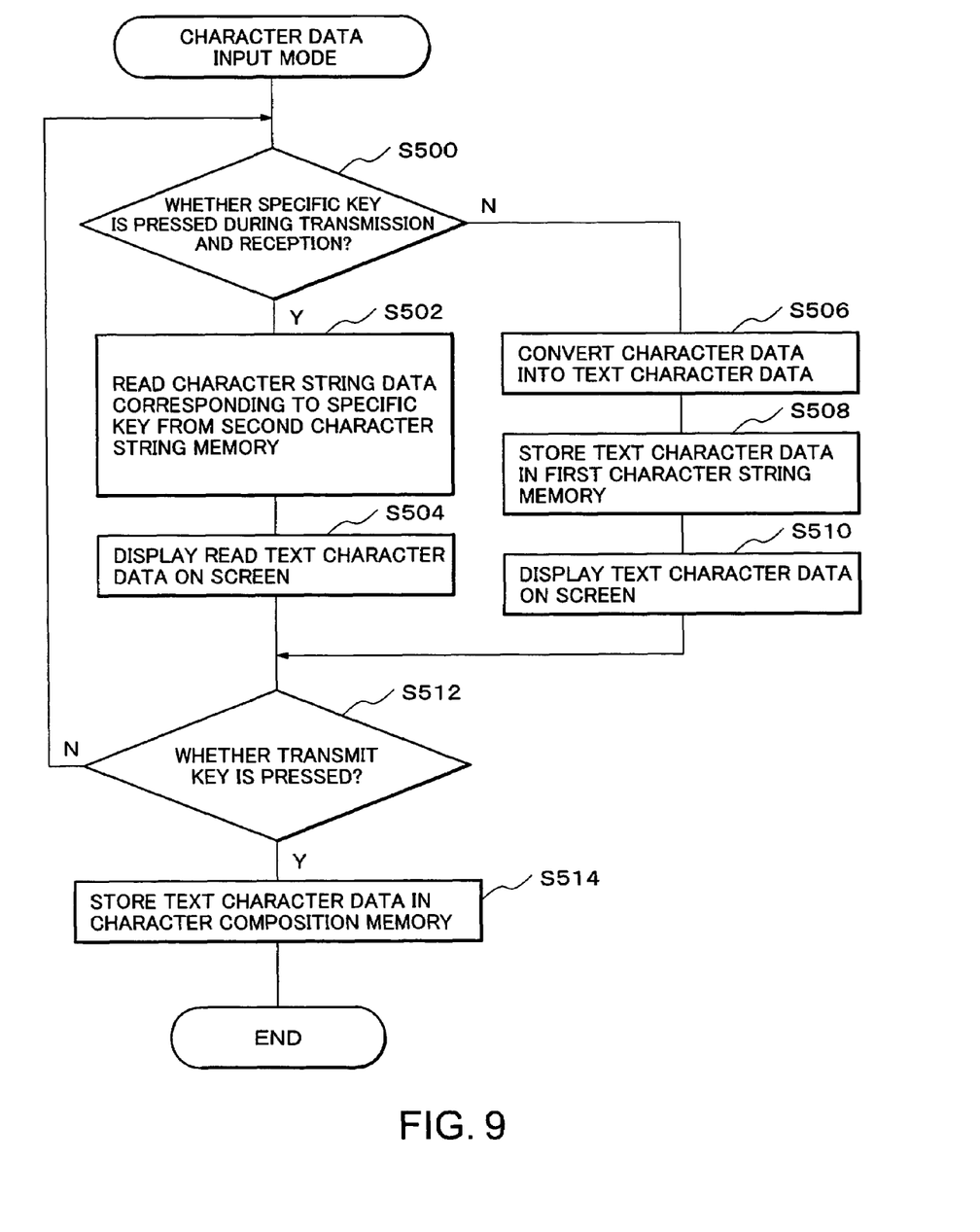
FIG. 9 is a subroutine showing a processing flow of a character data input mode according to the second embodiment.

Next, with reference to FIG. 9, description will be given of processing regarding the cellular telephone 100 of the second embodiment. FIG. 9 is a flowchart showing a processing routine executed by the controller 103 of the cellular telephone 100 shown in FIG. 7. A program regarding this processing routine is previously stored in a program region of the program memory 105e.

Note that, in this embodiment, since processing other than the character data input mode is the same as that of the first embodiment, detailed description thereof will be omitted. Specifically, the flowchart shown in FIG. 9 is processing of the character data input mode in the second embodiment.

As shown in FIG. 9, in Step S500, the key input circuit 103a determines whether or not a specific assigned key (not shown) in the keyboard 101a shown in FIG. 7 is pressed during communication of the videophone (transmission of image and voice data).

If Yes in Step S500, that is, if a specific key is pressed in transmission from the videophone, in Step S502, the CPU 103g and the key input circuit 103a refer to the character string table 600 shown in FIG. 8 and read the character string data corresponding to the specific key from the second character string memory 105f shown in FIG. 7. In Step S504, the CPU 103g and the display circuit 103d display the character string data read from the second character string memory 105f in a second display area 702 (see FIG. 10) of the display 102a shown in FIG. 7 for a predetermined period of time.

If No in Step S500, that is, if no specific key is pressed in the transmission from the videophone, the key input circuit 103a converts, in Step S506, the inputted character key data into text character data by use of a "character conversion table" stored in the conversion dictionary memory 105d shown in FIG. 7.

In Step S508, the CPU 103g stores the text character data read from the "character conversion table" in Step S500 in the first character string memory 105a shown in FIG. 7. In Step S510, the CPU 103g and the display circuit 103d display the text character data stored in Step S508 on the display 102a shown in FIG. 7 for a predetermined period of time.

In Step S512, the key input circuit 103a determines whether or not a transmit key arranged in the keyboard 101a shown in FIG. 7 is pressed. If No in Step S512, that is, if the transmit key is not pressed, the processing returns to Step S500 and the key input circuit 103a waits for an unillustrated specific key to be pressed.

If Yes in Step S512, that is, if the transmit key is pressed, in Step S514, the CPU 103g stores the text character data stored in the first character string memory 105a shown in FIG. 7 or the second character string memory 105f shown in FIG. 7 in the character composition memory 105c shown in FIG. 7. Note that, after the processing of Step S514, the processing of the character data input mode is terminated.

Note that, in the data composition mode (see FIG. 4), the CPU 103g reads the text character data from the character composition memory 105c (see FIG. 7), and the character composition circuit 104b controls image conversion of the text character data (conversion into YUV (a Y signal, a blue color difference signal (Cb) and a red color difference signal (Cr)) still image data and the like) in the image circuit 104a shown in FIG. 7. Moreover, the character composition circuit 104b incorporates the still image data (character image data), which is obtained by the image conversion, into the video image data described above and combines both data.

Figure 10:
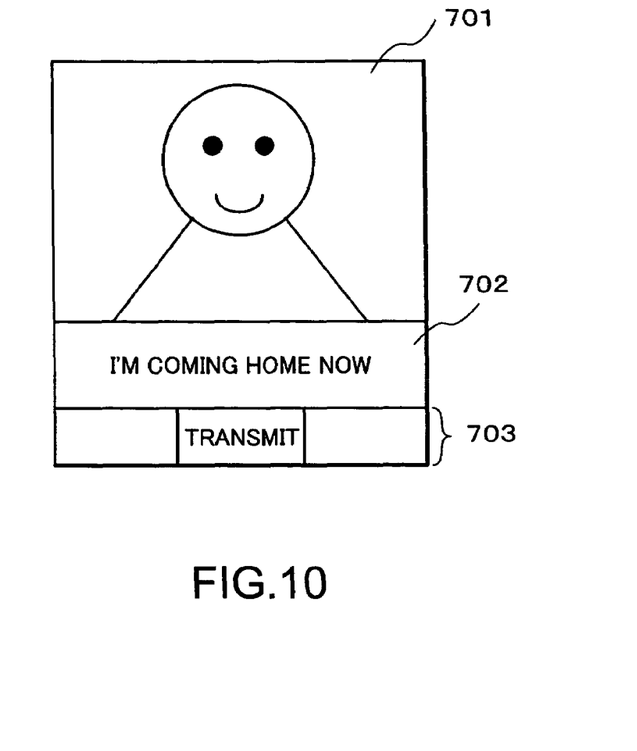
FIG. 10 is a view showing an example of displaying video image data and text character data on a display shown in FIG. 7.

Thus, the video image data converted in the image circuit 104a through the character composition circuit 104b shown in FIG. 7. For example, on the display 102a shown in FIG. 7, video image data is displayed in a first display area 701 as shown in FIG. 10. Moreover, for example, if the "2" key shown in FIG. 8 is pressed, the character string data ("I'm coming home now") which is assigned to the "2" key is displayed in the second display area 702 below the first display area 701. Note that, as shown in FIG. 10, in a third display area 703 below the second display area 702, display data "transmit" is displayed, which is displayed when the transmit key (not shown) of the keyboard 101a shown in FIG. 7 is pressed.

After the above-described data composition mode is terminated, the above-described composite data and the voice data obtained by use of the microphone 101c shown in FIG. 7 and the like are delivered (transmitted) to another cellular telephone through the transmitting and receiving circuit 106a shown in FIG. 7.

Figure 11:
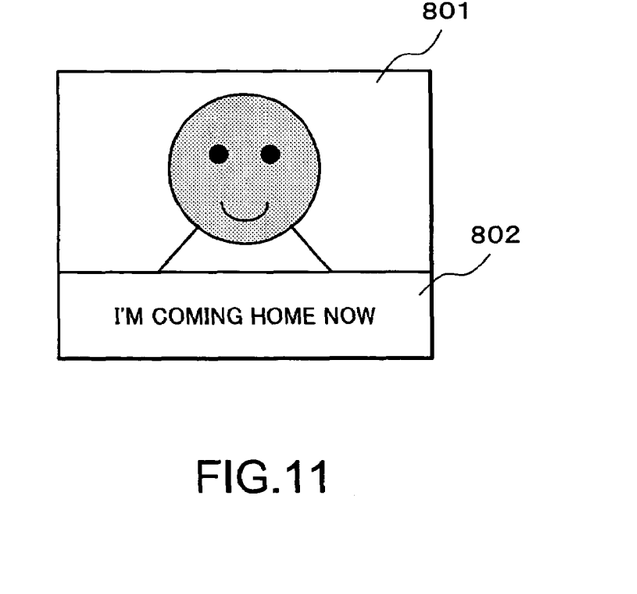
FIG. 11 is a view showing an example of displaying the video image data and the text character data, which are shown in FIG. 10, on a display of a receiving cellular telephone.

The composite data delivered to the other (receiving) cellular telephone is displayed on a display of the receiving cellular telephone, as shown in FIG. 11. Specifically, in a first display area 801, video image data as shown in FIG. 11 (the video image data corresponding to that shown in the first display area 701 of FIG. 10) is displayed. In a second display area 802 below the first display area 801, the character string data corresponding to that shown in the second display area 702 of FIG. 10 (for example, "I'm coming home now") is displayed while laterally scrolling the display area.

In this embodiment, character string data corresponding to a specific key is stored in the second character string memory 105f. Thus, the character string data is collectively outputted by pressing the above-described specific key.

Specifically, in this embodiment, the character string data previously stored in the second character string memory 105f is collectively outputted only by pressing the above-described specific key. Thus, the operation of inputting the text character (character string) data becomes quick and easy. Since effects of the other operations are the same as those of the first embodiment, detailed description thereof will be omitted.

Note that the processing flows of the respective programs (see FIGS. 2 to 4 and FIG. 9) described in the foregoing respective embodiments are an example and can be changed accordingly without departing from the scope of the present invention.

For example, Step S204 shown in FIG. 2 may be replaced with a Step of determining whether or not a key associated with character input is pressed (Step S300 in FIG. 3 or Step S500 in FIG. 9). Specifically, in the case of the modified example described above, since the operation of selecting the character data input mode can be omitted, usability is further improved. A combination pattern in the present invention may be a pattern of combining two examples or more among the foregoing respective embodiments and the modified example, for example.

Moreover, although the transmitting and receiving circuit 106a according to the embodiments of the present invention is an example of transmitting and receiving data by radio, transmission means of the present invention may form a communication path with a communication party by wire communication. The present invention does not care about a mode of wireless communication, and includes transmission means which forms a communication path such as to transmit and receive data through a mobile communication network including a base station and the Internet network, for example.

Furthermore, as shown in FIG. 1 or FIG. 7, the data processor according to the embodiments of the present invention is one including: the camera 101b and the like to be imaging means; the microphone 101c and the like to be voice input means; the keyboard 101a and the like to be character generation means; the communication unit 106 to be transmission means; the character composition circuit 104b to be data composition means; the character string memory 105a or 105f to be storage means; the controller 103 to be first or second processing means; and the display 102a (see FIG. 1) which has the first and second display areas 301 and 302 (see FIG. 5) or the first and second display areas 701 and 702 (see FIG. 10).

In the embodiments of the present invention, adopted is the configuration of including the above-described data processor in the cellular telephone 100. In the present invention, it may be configured that, for example, the data processor including, at least, the camera 101b, the keyboard 101a, the communication unit 106 and the character composition circuit 104b is included in electronic equipment such as personal computers and PDAs (Personal Digital Assistants). Specifically, the electronic equipment according to the present invention conceptually includes, for example, cellular telephones, personal computers, PDAs and the like.

What is claimed is:

1. A data processor comprising:
    an imaging circuit which forms an image of an object and generates image data of the image;
    a character generation circuit which generates character data;
    a converting circuit which converts the character data to character image data of image data configuration;
    a transmission circuit which connects to an opposite communication device through a communication path, and which transmits data to the opposite communication device;
    a data composition circuit which generates composite data by combining the image data generated by the imaging circuit with the character image data, during connection of the transmission circuit through the communication path;
    a storage circuit which previously stores character string data including a plurality of pieces of character data and which previously stores a table which associates the character string data with an assigned key to specify the character string data by establishing association; and
    a first processing circuit which, when the assigned key is operated, collectively reads the character string data associated with the assigned key from the storage circuit by referring to the table and which outputs the data,
    wherein the table associates the character string data with display processing data in displaying the character string data on a display.

2. The data processor according to claim 1,
    wherein the transmission circuit transmits the composite data generated by the data composition circuit to the opposite communication device during connection of the communication path.

3. The data processor according to claim 1, further comprising:
    a display for displaying the image and character data, which are combined by the data composition circuit, wherein the display is divided into a first display area for displaying the image data, and a second display area for displaying the character data.

4. The data processor according to claim 3, further comprising:
a second processing which adds specific display processing when the character data is displayed in the second display area.

5. The data processor according to claim 4,
wherein, when the character data is generated beyond the second display area, the second processing circuit scrolls the character string data within the second display area.

6. The data processor according to claim 1, wherein the display processing data comprises a display effect which is applied in the displaying of the character string data on the display.

7. A data processing method comprising:
generating image data by forming an image of an object;
generating character data;
converting the character data to character image data of image data configuration;
generating composite data obtained by combining the image data with the character image data during connection by a communication path;
previously storing character string data including a plurality of pieces of character data and previously storing a table which associates the character string data with an assigned key to specify the character string data by establishing association;
when the assigned key is operated, collectively reading the character string data associated with the assigned key by referring to the table and outputting the data; and
previously setting a correlation between the character string data and display processing data in displaying the character string data on a display.

8. The data processing method according to claim 7, further comprising:
transmitting the composite data to an opposite communication device during connection of the communication path.

9. The data processing method according to claim 7,
wherein a display for displaying the composite data obtained by combining the image data and the character data is divided into a first display area for displaying the image data and a second display area for displaying the character data, and displays the data.

10. The data processing method according to claim 9, further comprising:
adding specific display processing to the character data when the character data is displayed in the second display area.

11. The data processing method according to claim 10, further comprising:
scrolling the character string data within the second display area when the character data is generated beyond the second display area.

12. The data processing method according to claim 7, wherein the display processing data comprises a display effect which is applied in the displaying of the character string data on the display.

13. Electronic equipment comprising:
an imaging circuit which forms an image of an object and generates image data of the image;
a voice input circuit which inputs voices and generates voice data of the inputting voice;
a character generation circuit which generates character data;
a converting circuit which converts the character data to character image data of image data configuration;
a transmission circuit which connects to an opposite communication device through a communication path, and which continuously transmits the image data generated by the imaging circuit as well as the voice data generated by the voice input circuit to the opposite communication device;
a data composition circuit which generates composite data by combining the image data generated by the imaging circuit with the character image data, during connection of the transmission circuit through the communication path;
a storage circuit which previously stores character string data including a plurality of pieces of character data and which previously stores a table which associates the character string data with an assigned key to specify the character string data by establishing association; and
a first processing circuit which, when the assigned key is operated, collectively reads the character string data associated with the assigned key from the storage circuit by referring to the table and for outputting the data,
wherein the transmission circuit transmits the composite data generated by the data composition circuit to the opposite communication device during connection of the communication path, and
wherein the table associates the character string data with display processing data in displaying the character string data on a display.

14. The electronic equipment according to claim 13, further comprising:
a display for displaying the image and character data, which are combined by the data composition circuit,
wherein the display is divided into
a first display area for displaying the image data and
a second display area for displaying the character data.

15. The electronic equipment according to claim 14, further comprising:
a second processing circuit which adds specific display processing to the character data when the character data is displayed in the second display area.

16. The electronic equipment according to claim 15,
wherein, when the character data is generated beyond the second display area, the second processing circuit scrolls the character string data within the second display area.

17. The electronic equipment according to claim 13, wherein the display processing data comprises a display effect which is applied in the displaying of the character string data on the display.

* * * * *